(12) United States Patent
Xu et al.

(10) Patent No.: US 12,159,754 B2
(45) Date of Patent: Dec. 3, 2024

(54) LARGE-AREA CONTINUOUS FLEXIBLE FREE-STANDING ELECTRODE AND PREPARATION METHOD AND USE THEREOF

(71) Applicant: Beijing University of Chemical Technology, Beijing (CN)

(72) Inventors: Bin Xu, Beijing (CN); Mingzhi Li, Beijing (CN)

(73) Assignee: Beijing University of Chemical Technology, Beijing (CN)

( * ) Notice: Subject to any disclaimer, the term of this patent is extended or adjusted under 35 U.S.C. 154(b) by 540 days.

(21) Appl. No.: 17/395,243

(22) Filed: Aug. 5, 2021

(65) Prior Publication Data

US 2022/0044879 A1 Feb. 10, 2022

(30) Foreign Application Priority Data

Aug. 7, 2020 (CN) .................... 202010786627.X

(51) Int. Cl.
  *H01G 11/42* (2013.01)
  *C01B 32/184* (2017.01)
  *C01B 32/198* (2017.01)
  *H01G 11/24* (2013.01)
  *H01G 11/86* (2013.01)

(52) U.S. Cl.
  CPC .......... *H01G 11/42* (2013.01); *C01B 32/184* (2017.08); *C01B 32/198* (2017.08); *H01G 11/24* (2013.01); *H01G 11/86* (2013.01); *C01B 2204/04* (2013.01)

(58) Field of Classification Search
  CPC ...... H01G 11/42; H01G 11/86; C01B 32/184; C01B 32/198; C01B 2204/04
  USPC ........................................................ 427/122
  See application file for complete search history.

(56) References Cited

U.S. PATENT DOCUMENTS

| | | | | |
|---|---|---|---|---|
| 9,803,124 B2* | 10/2017 | Zhamu | ................... | C09K 5/14 |
| 10,938,032 B1* | 3/2021 | El-Kady | ................ | H01G 11/38 |
| 11,097,951 B2* | 8/2021 | Kowal | ................... | C01B 32/23 |
| 2012/0034442 A1* | 2/2012 | Pauzauskie | ............ | B82Y 30/00 |
| | | | | 977/734 |
| 2016/0101398 A1* | 4/2016 | Worsley | ............... | B01J 13/0091 |
| | | | | 427/372.2 |
| 2016/0332886 A1* | 11/2016 | Zhang | ..................... | C01B 32/23 |
| 2018/0034055 A1* | 2/2018 | Kim | ....................... | H01G 11/36 |
| 2019/0308880 A1* | 10/2019 | Tour | ..................... | C01B 32/184 |
| 2020/0048095 A1* | 2/2020 | Xie | ....................... | C01B 32/318 |
| 2020/0194793 A1* | 6/2020 | Ozgit | ................... | H01M 4/625 |
| 2020/0280054 A1* | 9/2020 | Jang | .................... | H01M 4/625 |
| 2021/0005879 A1* | 1/2021 | Joo | ....................... | H01M 4/661 |
| 2021/0020384 A1* | 1/2021 | Liu | ....................... | H01G 11/34 |
| 2022/0302458 A1* | 9/2022 | Yoon | ................... | H01M 8/0241 |

FOREIGN PATENT DOCUMENTS

CN          109456645 A * 3/2019 ............ C09D 11/52

* cited by examiner

*Primary Examiner* — Brian K Talbot
(74) *Attorney, Agent, or Firm* — David R. Stevens; Stevens Law Group

(57) ABSTRACT

A method for preparing a large-area continuous flexible free-standing electrode is provided. The method includes: mixing a reduced graphene oxide, porous carbon particles and a solvent, and dispersing the resulting mixture to obtain a mixed slurry; coating the mixed slurry onto a hydrophobic substrate, and drying, to prepare the large-area continuous flexible free-standing electrode.

6 Claims, 5 Drawing Sheets

LARGE-AREA CONTINUOUS FLEXIBLE FREE-STANDING ELECTRODE AND PREPARATION METHOD AND USE THEREOF

CROSS REFERENCE TO RELATED APPLICATION

This patent application claims the benefit and priority of Chinese Patent Application No. 202010786627.X filed on Aug. 7, 2020, the disclosure of which is incorporated by reference herein in its entirety as part of the present application.

TECHNICAL FIELD

The disclosure relates to the technical field of electrodes, in particular to a large-area continuous flexible free-standing electrode and a preparation method and use thereof.

BACKGROUND ART

Due to the advantages of high power and long cycle life, supercapacitors have broad application prospects in the fields of electric vehicles, aerospace, uninterruptible power supplies, and consumer electronics, and have attracted much attention. Porous carbon material is the most common electrode material for commercial supercapacitors because of its large specific surface area, controllable pore size, and low price. The traditional method for preparing an electrode comprises blending an active material, a conductive agent, and a polymer binder to obtain a slurry, and coating or rolling the slurry onto a current collector foamed nickel or an aluminum foil to obtain the electrode. However, it is difficult to obtain a flexible electrode with high energy density and high power by using the polymer binder on the following grounds: (1) the polymer binders such as PTFE and PVDF are all insulators, and the addition of them would increase electrode resistance, which is not conducive to improving the power performance of supercapacitors; (2) the binder usually accounts for 5% to 20% of the mass of the electrode, but it does not contribute to the capacitance of the electrode, and may also block part of the pores of the carbon material, thereby reducing the energy density of the electrode; (3) the binder containing fluorine will produce highly toxic fluoride during incineration, causing serious pollution to the environment.

Graphene is a novel carbon material with two-dimensional nanostructure. It exhibits good mechanical properties, high electrical conductivity, and high specific surface area, and could be directly used as an electrode material for supercapacitors and lithium-ion batteries. There have been many reports on the use of graphene to prepare flexible electrode materials. For example, a patent entitled by "method for preparing $MnO_2$ nanospheres/graphene/active carbon flexible film electrodes" (application No. 201810342956.8) discloses that active carbon particles are interspersed between graphene sheets to increase interlayer spacing, and then the resulting dispersion is vacuum filtered to obtain a flexible, free-standing graphene/active carbon film, in which the graphene acts as a binder and conductive agent, and a mass ratio of the graphene oxide to the active carbon particles is in the range of 10:1 to 1:5. The idea of the above patent is to use the active material as a spacer to maximize the specific surface area of the graphene. Another patent entitled by "flexible, free-standing full carbon electrode with graphene as a binder for supercapacitors and preparation method thereof" (application No. 201711299616.3) discloses that the film was prepared by vacuum filtering the mixture of activated porous carbon particles dispersion and graphene oxide dispersion in which the activated porous carbon acts as an active material, and the graphene acts as a binder, conductive agent and auxiliary active material simultaneously; the electrode prepared by using graphene as a conductive binder exhibits better specific capacitance and rate performance. In the current research, the flexible electrodes are mostly prepared by vacuum filtration with graphene as a conductive binder. However, this method is limited by the diameter of the bottom of the vacuum filtration cup. Only one circular film electrode with a diameter of 4 cm could be obtained when using current common filtration equipment one time. Therefore, the area of the prepared continuous film electrodes at one time is limited, thereby being difficult in the large-scale mass production of large-area continuous flexible electrodes. Meanwhile, during the preparation of the film electrode, water is discharged under great vacuum pressure, making the structure between the graphene sheets and the active material dense, thereby reducing the specific surface area, and then reducing the specific capacitance and rate performance of the electrode.

SUMMARY

An object of the present disclosure is to provide a large-area continuous flexible free-standing electrode and a preparation method and use thereof. The method for preparing the large-area continuous flexible free-standing electrode of the present disclosure not only overcomes the drawbacks of using the polymer binder in traditional electrode preparation process, but also makes it possible to mass-produce large-area continuous flexible electrodes on a large scale, and results in excellent specific capacitance and rate performance.

In order to achieve the above-mentioned object, the present disclosure provides the following technical solutions.

The present disclosure provides a method for preparing a large-area continuous flexible free-standing electrode, comprising the following steps:

(1) mixing a reduced graphene oxide, porous carbon particles and a solvent, and dispersing the resulting mixture to obtain a mixed slurry, wherein the reduced graphene oxide has a sheet number of 2 to 6 and a sheet diameter of 1 to 20 μm, the porous carbon particles have a particle size of 1 to 5 μm, a mass ratio of the reduced graphene oxide and the porous carbon particles is in the range of (0.05-0.5):1, and the mixed slurry has a mass volume concentration of 5 to 20 mg/mL; and (2) coating the mixed slurry obtained in step (1) onto a hydrophobic substrate, and drying, to obtain the large-area continuous flexible free-standing electrode.

In some embodiments, the porous carbon particles in step (1) have a particle size of 1 to 5 μm.

In some embodiments, the porous carbon particles have a specific surface area of 1500 to 4500 $m^2/g$.

In some embodiments, the reduced graphene oxide in step (1) is obtained by reducing graphene oxide through a high-temperature method or a chemical method.

In some embodiments, the graphene oxide is prepared by a process, which is one or more selected from the group consisting of a modified Hummer's method, Brodie's process, and Staudenmaier's process.

In some embodiments, the solvent in step (1) includes one or more selected from the group consisting of N,N-dimethylformamide, ethanol, methanol, isopropanol, ethylene glycol, N-methylpyrrolidone, and tetrahydrofuran.

In some embodiments, the dispersing in step (1) comprises stirring and sonicating the resulting mixture in sequence.

In some embodiments, coating the mixed slurry obtained in step (1) onto a hydrophobic substrate in step (2) is performed by a means which is one or more selected from the group consisting of automatic blade coating, slot extrusion coating, roll coating, air-knife coating, and dip coating.

The present disclosure provides a large-area continuous flexible free-standing electrode prepared by the method described in the above technical solution, comprising a three-dimensional conductive network structure which is formed by cross-stacking the reduced graphene oxide sheets and porous carbon particles.

The present disclosure provides a large-area continuous flexible free-standing electrode prepared by the method as mentioned before and the use of the electrode in supercapacitors.

Beneficial Effects:

The present disclosure provides a method for preparing a large-area continuous flexible free-standing electrode, comprising the following steps: (1) mixing a reduced graphene oxide, porous carbon particles and a solvent, and dispersing the resulting mixture to obtain a mixed slurry, wherein the reduced graphene oxide has a sheet number of 2 to 6 and a sheet diameter of 1 to 20 μm, the porous carbon particles have a particle size of 1 to 5 μm, a mass ratio of the reduced graphene oxide and the porous carbon particles is in the range of (0.05-0.5):1, and the mixed slurry has a mass volume concentration of 5 to 20 mg/mL; (2) coating the mixed slurry onto a hydrophobic substrate, and drying, to obtain the large-area continuous flexible free-standing electrode. In the method according to the present disclosure, the mass ratio of the reduced graphene oxide and the porous carbon particles is in the range of (0.05-0.5):1, the reduced graphene oxide has a sheet number of 2 to 6 and a sheet diameter of 1 to 20 μm, and the porous carbon particles have a particle size of 1 to 5 μm, making it possible to wrap a large number of porous carbon particles by using only a small amount of the reduced graphene oxide, thereby obtaining a large-area continuous flexible free-standing electrode, which maintain the original highly developed pore structure of the porous carbon particles. In addition, the contact area between the electrode and the electrolyte is increased, which benefits from the loose three-dimensional conductive network structure constructed by the graphene sheets and porous carbon particles. Meanwhile, the electrode, prepared by the mentioned method, could achieve high specific capacitance and excellent rate performance by avoiding the use of a fluorine-containing polymer binder. The mass volume concentration of the mixed slurry could determine whether the mixed slurry could be automatically casted to form a mixed slurry layer, and whether the continuity of the electrode could be guaranteed after removing the solvent. Compared with the previous vacuum filtration method, the method of the present disclosure makes it possible to obtain an electrode having a looser pore structure without each component being compressed by external force, and complete structure of the "three-dimensional network embedded" constructed by the co-assembly of the graphene and the porous carbon material could be retained relatively, which increases the contact area between the active material and the electrolyte, thereby improving the rate performance of the electrode. Moreover, the method is not limited by the area of the filtration cup in the filtration equipment, and large-area continuous flexible films could be prepared in batches with simple operation. The experimental results show that the method of the present disclosure breaks the limitation of the electrode area prepared by the filtration method. The large-area continuous flexible free-standing electrode prepared in Example 1 of the present disclosure is assembled into a supercapacitor and subjected to a performance test. Cyclic voltammetry test exhibits that the curves maintain a regular rectangular shape at different scan rates, showing the characteristic of a standard electric double layer capacitance; constant current charge and discharge performance test displays that at a current density of 0.1 A/g, the specific capacitance of the electrode could reach 321.3 F/g, and could still be maintained at 254.4 F/g at a current density of 20 A/g, presenting high specific capacitance and excellent rate performance.

DETAILED DESCRIPTION OF THE EMBODIMENTS

Figure 1:
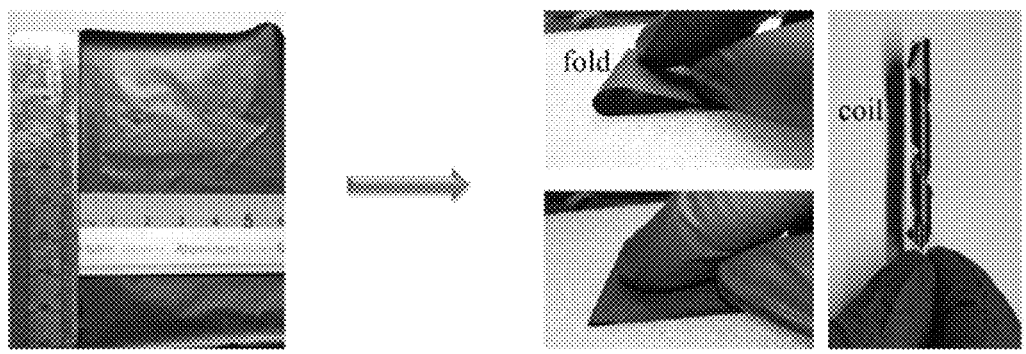
FIG. 1 shows a flexible digital photo of the large-area continuous flexible free-standing electrode as prepared in Example 1.

The present disclosure provides a method for preparing a large-area continuous flexible free-standing electrode, comprising the following steps:

(1) mixing a reduced graphene oxide, porous carbon particles and a solvent, and dispersing the resulting mixture to obtain a mixed slurry, wherein the reduced graphene oxide has a sheet number of 2 to 6 and a sheet diameter of 1 to 20 μm, the porous carbon particles have a particle size of 1 to 5 μm, a mass ratio of the reduced graphene oxide and the porous carbon particles is in the range of (0.05-0.5):1, and the mixed slurry has a mass volume concentration of 5 to 20 mg/mL; and (2) coating the mixed slurry obtained in step (1) onto a hydrophobic substrate, and drying, to obtain the large-area continuous flexible free-standing electrode.

In the present disclosure, a mixture of the reduced graphene oxide, the porous carbon particles and the solvent is dispersed.

In the present disclosure, a mass ratio of the reduced graphene oxide and the porous carbon particles is in the range of (0.05-0.5):1, preferably (0.08-0.4):1, and more preferably (0.1-0.3):1. In the present disclosure, the porous carbon particles act as an active material, and the reduced graphene oxide acts as a conductive binder. The electrode exhibits both excellent flexibility, high specific capacitance and excellent rate performance, when the mass ratio of the reduced graphene oxide to the porous carbon particles is defined in the above range.

In the present disclosure, the porous carbon particles have a particle size of 1 to 5 μm, preferably 2 to 4 μm, and a specific surface area of 1500 to 4500 $m^2/g$, preferably 1600 to 4000 $m^2/g$, more preferably 1800 to 3500 $m^2/g$. In the present disclosure, the porous carbon particles act as an active material of the electrode. The particle size and specific surface area of the porous carbon particles defined in the above range further improves the specific capacitance and rate performance of the electrode. In the present disclosure, there is no particular limitation on the source of the porous carbon particles, and commercially available products well known to those skilled in the art may be used, as long as particle size and specific surface area defined in the above range could be achieved.

In some embodiments of the present disclosure, the shape of the porous carbon particles includes one or more selected from the group consisting of powder, fiber, and sphere. In the present disclosure, the shape of the porous carbon particles as defined above further improves the specific capacitance and rate performance of the electrode.

In the present disclosure, under the condition that the porous carbon particles have a certain humidity and could not be directly used, the porous carbon particles are subjected to a drying in some embodiments. In some embodiments of the present disclosure, the drying is performed at a temperature of 60 to 90° C., and the drying is performed for 3 to 5 hours.

In the present disclosure, the reduced graphene oxide has a sheet number of 2 to 6, preferably 4 to 6. In the present disclosure, the reduced graphene oxide acts as a conductive binder to wrap the porous carbon particles. The reduced graphene oxide with a sheet number defined in the above range provides more sheets for wrapping more porous carbon particles, and thus wrap more porous carbon particles, thereby making the obtained electrode exhibits not only flexibility, but also more excellent specific capacitance and rate performance.

In the present disclosure, the reduced graphene oxide has a sheet diameter of 1 to 20 μm, preferably 3 to 15 μm, and more preferably 5 to 10 μm. In the present disclosure, the reduced graphene oxide with a sheet diameter defined in the above range, provides a larger specific surface area for wrapping the porous carbon particles, thereby achieving that a large quantity of the porous carbon particles could be wrapped by a small quantity of reduced graphene oxide, and making the obtained electrode exhibits not only good flexibility, but also more excellent specific capacitance and rate performance.

In some embodiments of the present disclosure, the reduced graphene oxide is prepared by reducing graphene oxide through a high-temperature method or a chemical method. In the present disclosure, under the condition that the reduced graphene oxide is prepared by the above method, the graphene oxide could be reduced more thoroughly; the reduced graphene oxide contains less oxygen, and exhibits better conductivity, which is more conducive to improving the electrochemical performance of the electrode.

In some embodiments of the present disclosure, the high-temperature method to obtain reduced graphene oxide comprises heating the graphene oxide at a temperature of 200° C. to 600° C. for 1 to 6 hours under the protection of an inert atmosphere. In the present disclosure, there is no particular limitation to the heat-treatment device, and commercially available heat-treatment devices well known to those skilled in the art may be used. In some embodiments of the present disclosure, the heat-treatment device is a tube furnace.

In some embodiments of the present disclosure, the chemical method comprises adding graphene oxide to a reductant, and subjecting them to a reduction reaction at a temperature of 50 to 100° C. for 1 to 5 hours to obtain a reduced graphene oxide. In some embodiments of the present disclosure, the reductant includes one or two selected from the group consisting of hydrazine hydrate, vitamin C, hydrogen iodide, and acetic acid.

In some embodiments of the present disclosure, the graphene oxide is prepared by a process which is one or more selected from the group consisting of a modified Hummer's method, Brodie's process, and Staudenmaier's process, and more preferably, the graphene oxide is prepared by Hummer's method.

In some embodiments of the present disclosure, the solvent includes one or more selected from the group consisting of N,N-dimethylformamide, ethanol, methanol, isopropanol, ethylene glycol, N-methylpyrrolidone, and tetrahydrofuran. In the present disclosure, the solvent as defined above allows a uniform dispersion of the reduced graphene oxide and the porous carbon particles, which is more conducive to forming a three-dimensional conductive network structure constructed by graphene sheets and porous carbon particles.

In the present disclosure, the mixed slurry has a mass volume concentration of 5 to 20 mg/mL, preferably 8 to 15 mg/mL, and more preferably 10 to 14 mg/mL. In the present disclosure, the mixed slurry with a mass volume concentration defined in the above-mentioned range makes it possible to be automatically casted to form a mixed slurry layer, and maintain the continuity of the electrode after removing the solvent.

In the present disclosure, there is no particular limitation to the mixing operation of the reduced graphene oxide, the porous carbon particles, and the solvent, and the mixing operations well known to those skilled in the art may be used.

In some embodiments of the present disclosure, the dispersing comprises stirring and sonicating the mixture in sequence. In some embodiments of the present disclosure, the stirring is performed at a rate of 200 to 500 r/min, more preferably 250 to 450 r/min, and most preferably 300 to 400 r/min; in some embodiments, the stirring is performed for 5 to 30 h, more preferably 10 to 25 h, and most preferably 15 to 20 h. In the present disclosure, the stirring as defined above allows the porous carbon particles and reduced graphene oxide to be macroscopically dispersed in the solvent. In some embodiments of the present disclosure, a device for the stirring includes one or more selected from the group consisting of homogenizer, manual mortar grinding, double planetary mixer, impeller stirrer, and magnetic stirrer, and the more preferable device for the stirring is a homogenizer.

In some embodiments of the present disclosure, sonicating the resulting mixture is performed under an ultrasound having a power of 200 to 600 W, more preferably 300 to 550 W, and most preferably 350 to 400 W; in some embodiments, sonicating the resulting mixture is performed for 1 to 4 hours, and more preferably 2 to 3 hours. In the present disclosure, sonicating the resulting mixture is to thoroughly disperse the micro-nano structure. Sonicating the resulting mixture under the condition as defined above further improves electrochemical performance and flexibility of the electrode, by evenly dispersing the porous carbon particles and the reduced graphene oxide which have been macroscopically dispersed in the solvent.

After the mixed slurry is obtained, the mixed slurry is coated onto a hydrophobic substrate and dried, to obtain the large-area continuous flexible free-standing electrode.

In some embodiments of the present disclosure, coating the mixed slurry obtained in step (1) onto a hydrophobic substrate in step (2) is performed by a means which includes one or more selected from the group consisting of automatic blade coating, slot extrusion coating, roll coating, air-knife coating, and dip coating. In the present disclosure, the coating means makes it possible to uniformly distribute the mixed slurry on the hydrophobic substrate, which is more conducive to the casting of the mixed slurry, finally forming an electrode film with uniform thickness on the hydrophobic substrate.

In the present disclosure, the area of the electrode obtained is determined by the coating amount of the mixed slurry. In the present disclosure, under the condition that the mass ratio of the porous carbon particles to the reduced graphene is defined, and the concentration of the mixed slurry is defined, a continuous electrode of any area could be obtained by adjusting the coating amount. In the present disclosure, there is no particular limitation to the coating amount, and the coating amount may be determined according to the area of the electrode obtained as required. In the present disclosure, under the condition that the mixed slurry has a concentration of 5 to 20 mg/mL, a mass ratio of the reduced graphene oxide and the porous carbon particles is in the range of (0.05-0.5):1, and the coating amount is 20 to 30 mL, the area of the free-standing electrode could reach 300 $cm^2$. The method of the present disclosure could break through the limitation of the traditional preparation process on the electrode area, and makes it possible to obtain a large-area flexible electrode with good continuity.

In some embodiments of the present disclosure, the hydrophobic substrate includes one or more selected from the group consisting of Celgard film, Teflon mold, PP film, and glass plate. In the present disclosure, there is no particular limitation to the source of the hydrophobic substrate, and commercially available products well known to those skilled in the art may be used. In the present disclosure, under the condition that the hydrophobic substrate is defined as above, after drying the mixed slurry, the electrode and the hydrophobic substrate are easily separated, which is more conducive to obtaining a large-area continuous flexible free-standing electrode.

In some embodiments of the present disclosure, the drying includes a natural drying and an oven drying in sequence. In some embodiments of the present disclosure, the above-mentioned natural drying is performed as follows: leaving to stand naturally at ambient temperature for 10 to 20 hours. In the present disclosure, the natural drying is to naturally volatilize the solvent in the mixed slurry to form an electrode film, which is beneficial to the separation of the electrode film from the hydrophobic substrate.

In some embodiments of the present disclosure, the drying is performed as follows: after the natural drying, first removing the substrate, and then drying in an oven to obtain the large-area continuous flexible free-standing electrode.

In some embodiments of the present disclosure, the oven drying is performed at a temperature of 60 to 80° C., and more preferably 65 to 75° C.; in some embodiments, the oven drying is performed for 6 to 10 h, and more preferably 7 to 9 h. In the present disclosure, there is no particular limitation to the drying device, and drying devices well known to those skilled in the art may be used. In some embodiments of the present disclosure, the drying device is a vacuum oven. In the present disclosure, the drying is to further remove the solvent in the mixed slurry or electrode film to obtain the large-area continuous flexible free-standing electrode.

The method of the present disclosure utilizes the principle of solvent evaporation resulting in self-assembly of the nanosheets, to construct a three-dimensional conductive network structure composed of the reduced graphene oxide sheets and the the active material, i.e. the porous carbon particles. Compared with the traditional film-making method by a vacuum filtration, the method can prepare a large-area continuous flexible free-standing electrode at one time, and is suitable for large-scale production and preparation.

The present disclosure also provides a large-area continuous flexible free-standing electrode prepared by the method described in the above technical solution, comprising a three-dimensional conductive network structure formed by cross-stacking the reduced graphene oxide and the porous carbon particles.

In the present disclosure, the porous carbon particles in the large-area continuous flexible free-standing electrode act as the active material, and the reduced graphene oxide acts as the conductive binder, among them the mass ratio of the reduced graphene oxide to the porous carbon particles is in the range of (0.05-0.5):1. This electrode structure maintains the original highly developed pore structure of porous carbon particles. In addition, the contact area between the electrode and the electrolyte is increased, which benefits from the loose three-dimensional conductive network structure constructed by the graphene sheets and porous carbon particles. Meanwhile, the electrode, prepared by the mentioned method, could achieve high specific capacitance and excellent rate performance by avoiding the use of a fluorine-containing polymer binder.

The present disclosure also provides the use of the flexible free-standing electrode in supercapacitors. In the present disclosure, there is no particular limitation to the use method of the large-area continuous flexible free-standing electrode in the supercapacitor, and the use method of the electrode in the supercapacitor well known to those skilled in the art may be used.

In Examples of the present disclosure, the method for testing the electrode performance of the flexible free-standing electrode in a supercapacitor includes using two circular flexible all-carbon composite with a diameter of 10 mm as two electrodes, cellulose paper as a separator, and a KOH aqueous solution with a concentration of 6 M as a electrolyte, assembling to a supercapacitor, and performing electrochemical tests.

In the present disclosure, the flexible free-standing electrode for supercapacitors exhibits excellent rate performance, cycle performance, and excellent flexibility.

The technical solutions of the present disclosure will be clearly and completely described below in conjunction with the Examples of the present disclosure. Obviously, the described examples are only a part of the examples of the present disclosure, rather than all examples. Based on the examples of the present disclosure, all other examples obtained by those skilled in the art without creative work shall fall within the protection scope of the present disclosure.

Example 1

Raw Materials:
porous carbon particles with a specific surface area of 2703 m$^2$/g, and a particle size of 1-5 μm; and
reduced graphene oxide (rGO): the graphene oxide solution prepared by the modified Hummer's method was freeze-dried, and the dried GO was taken out and placed in a crucible. The crucible was placed in the center of a tube furnace and heated at 500° C. for 5 hours under the protection of an inert gas to obtain a reduced graphene oxide (which has a sheet number of 2 to 4, and a sheet diameter of 2 to 10 μm).
Preparation of the Electrode:
(1) 20 mg of the reduced graphene oxide, 80 mg of the porous carbon particles were mixed with 10 mL of N,N-dimethylformamide, and the resulting mixture was put into a homogenizer, and stirred at a rotation speed of 300 r/min for 5 hours, and then dispersed under ultrasonic (with a power of 400 W) for 1 hour, obtaining a uniformly mixed slurry (in which the mass ratio of the reduced graphene oxide and the porous carbon particles was 0.25:1, and the concentration of the mixed slurry was 10 mg/mL).
(2) The obtained mixed slurry was poured onto a Celgard film, leveled by an automatic blade coater, and then left to stand at ambient temperature for 20 hours. After forming a film, the film was peeled off and dried in a vacuum oven at 80° C. for 8 hours, obtaining the large-area continuous flexible free-standing electrode.
Performance Test of the Electrode:
The large-area continuous flexible free-standing electrode prepared in Example 1 was subjected to performance tests as follows: two circular flexible all-carbon composite with a diameter of 10 mm were used as two electrodes, cellulose paper was used as a separator, and an aqueous KOH solution with a concentration of 6 M was used as an electrolyte, and they were assembled into a supercapacitor, and the supercapacitor was subjected to electrochemical performance tests.

Figure 2:
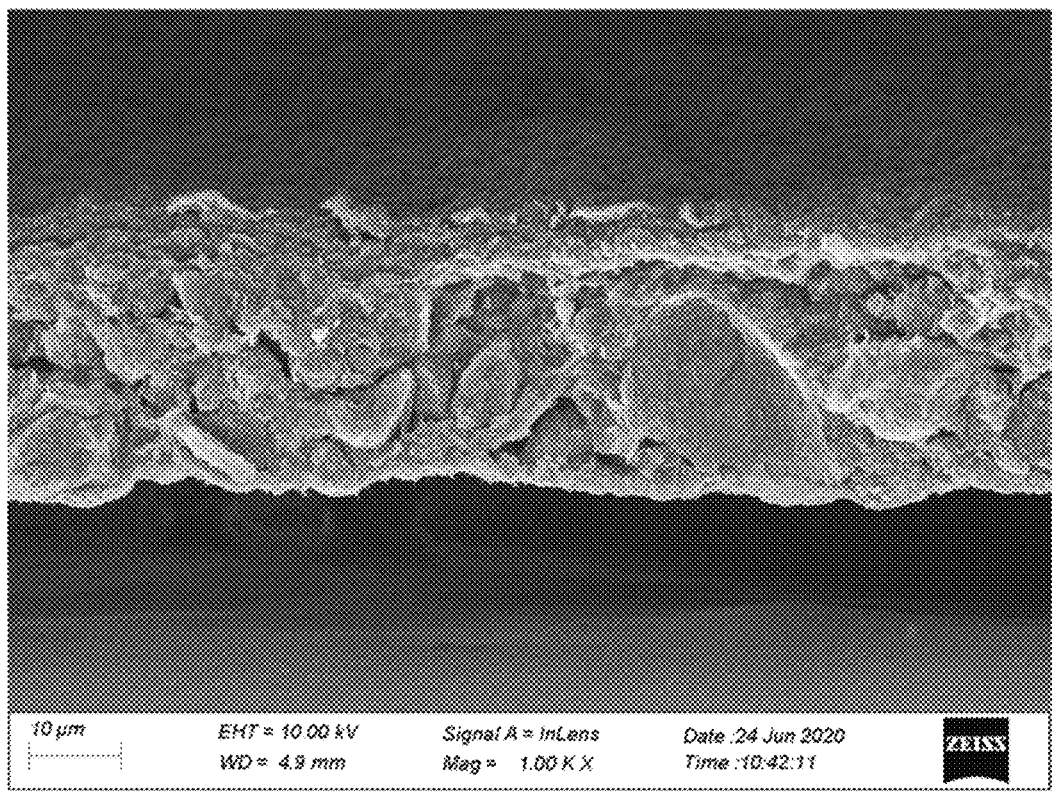
FIG. 2 shows a SEM microstructure characterization of the large-area continuous flexible free-standing electrode as prepared in Example 1.
Figure 3:
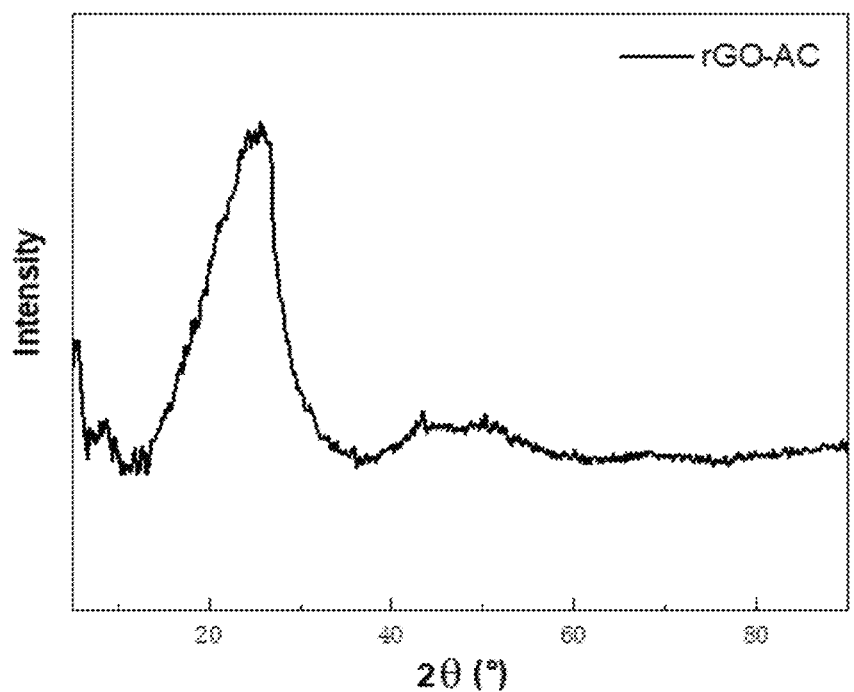
FIG. 3 shows an X-ray diffraction pattern of the large-area continuous flexible free-standing electrode as prepared in Example 1.
Figure 4:
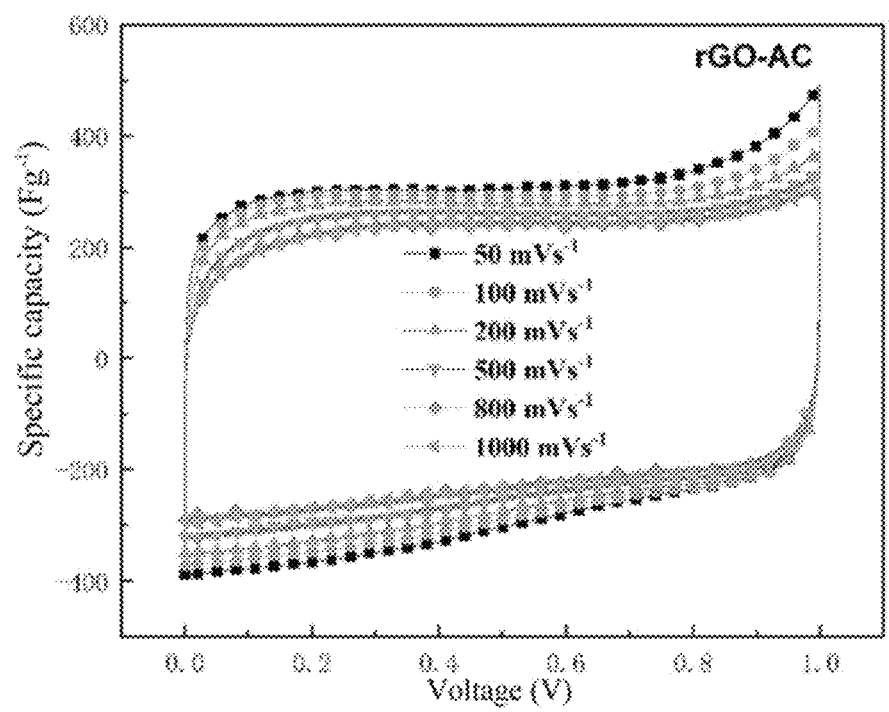
FIG. 4 shows cyclic voltammetry curves of the flexible free-standing electrode as prepared in Example 1 when used in a supercapacitor.
Figure 5:
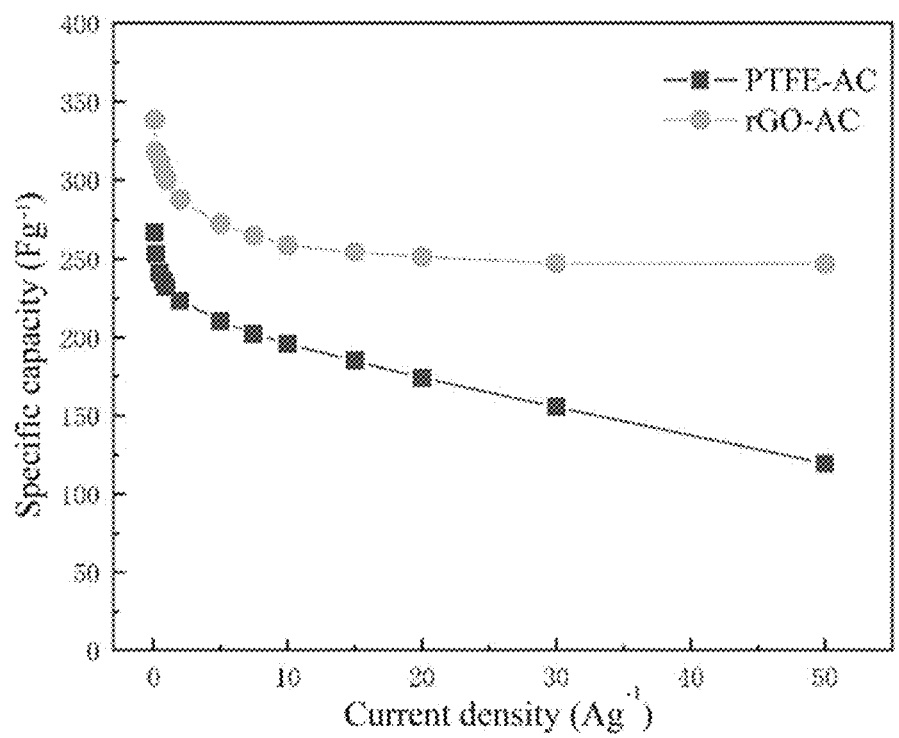
FIG. 5 shows charge and discharge curves of the flexible free-standing electrode as prepared in Example 1 and the traditional porous carbon electrode prepared by using PTFE as the binder in Comparative Example 1 at different rates.

FIG. 1 shows a flexible digital photo of the large-area continuous flexible free-standing electrode as prepared in Example 1;

FIG. 2 shows a SEM image of the large-area continuous flexible free-standing electrode as prepared in Example 1;

FIG. 3 shows an X-ray diffraction pattern of the large-area continuous flexible free-standing electrode as prepared in Example 1;

FIG. 4 shows cyclic voltammetry curves of the flexible free-standing electrode as prepared in Example 1 when used in a supercapacitor;

FIG. 5 shows charge and discharge curves of a supercapacitor using the flexible free-standing electrode as prepared in Example 1.

It can be seen from FIG. 1 that the flexible free-standing electrode can be bent close to 180 degrees, showing good flexibility.

It can be seen from FIG. 2 that the porous carbon particles in the flexible free-standing electrode are evenly wrapped by graphene sheets, forming a stable three-dimensional network structure.

It can be seen from FIG. 3 that there are (002) diffraction peak and (100) diffraction peak at 22° to 25° and 41° to 45° respectively, which are typical diffraction peaks of carbon materials, showing that there is a stable physical bond between the reduced graphene oxide and the activated carbon, without change in crystal structure.

It can be seen from FIG. 4 that at different scan rates, the curves maintain rectangular in shape, showing the characteristic of a standard electric double layer capacitance.

It can be seen from FIG. 5 that at a current density of 0.1 A/g, the specific capacitance of the flexible free-standing electrode could reach 321.3 F/g, and could still maintain 254.4 F/g at a current density of 20 A/g, showing high specific capacitance and excellent rate performance.

Example 2

Raw Materials:
porous carbon particles with a specific surface area of 2308 m$^2$/g, and a particle size of 1-5 μm; and
reduced graphene oxide (rGO): the graphene oxide solution prepared by the modified Staudenmaier method was freeze-dried, and the dried GO was taken out and placed in a crucible. The crucible was placed in the center of a tube furnace, and heated to 400° C. under the protection of an inert gas and kept at the temperature for 5 hours, obtaining a reduced graphene oxide (which has a sheet number of rGO of 2 to 5, and a sheet diameter of 1 to 8 μm).
Preparation of the Electrode:
(1) 30 mg of the reduced graphene oxide, 70 mg of the porous carbon particles were mixed with 6 mL of ethanol, and the resulting mixture was poured into a homogenizer, stirred at a rotation speed of 400 r/min for 5 hours, and then dispersed under an ultrasonic (with a power of 400 W) for 1 hour, obtaining a uniformly mixed slurry (in which the mass ratio of the reduced graphene oxide and the porous carbon particles was 0.43:1, and the concentration of the mixed slurry was 16.7 mg/mL).
(2) The obtained mixed slurry was poured on a Teflon board, leveled by an automatic blade coater, and then left to stand at ambient temperature for 20 hours. After forming a film, the film was peeled off and dried in a vacuum oven at 80° C. for 6 hours, obtaining the large-area continuous flexible free-standing electrode.
Performance Test of the Electrode:
The large-area continuous flexible free-standing electrode prepared in Example 2 was subjected to a performance test as follows (indicated by the legend "rGO-AC-2" in the figure): two circular flexible all-carbon composite electrodes with a diameter of 10 mm were used as two electrode sheets, cellulose paper was used as a separator, and an aqueous KOH solution with a concentration of 6M was used as an electrolyte, and they were assembled into a supercapacitor.

Figure 6:
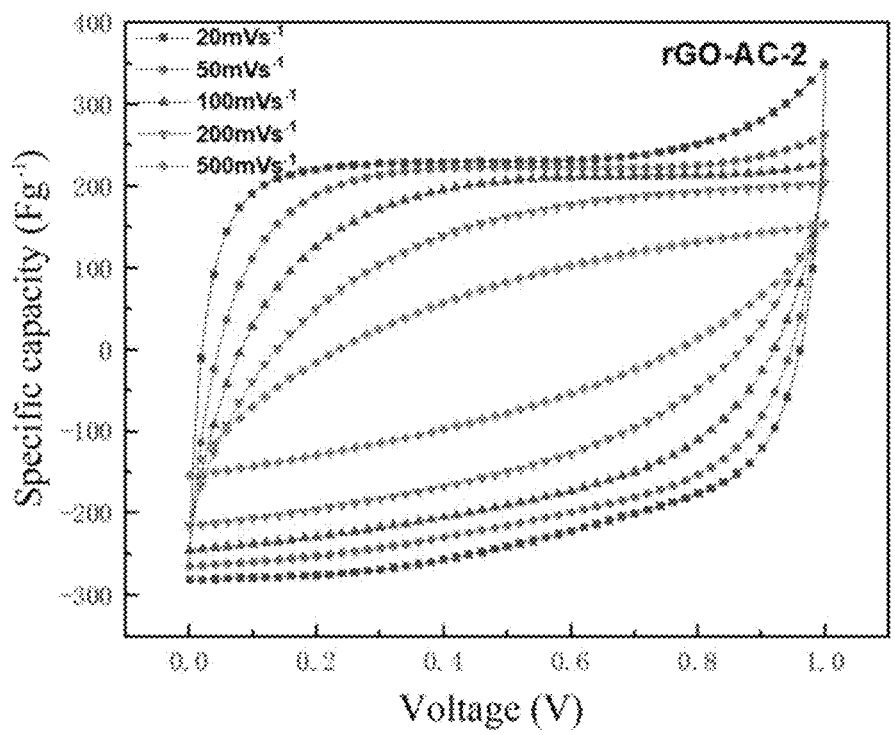
FIG. 6 shows cyclic voltammetry curves of the flexible free-standing electrode as prepared in Example 2 when used in a supercapacitor.
Figure 7:
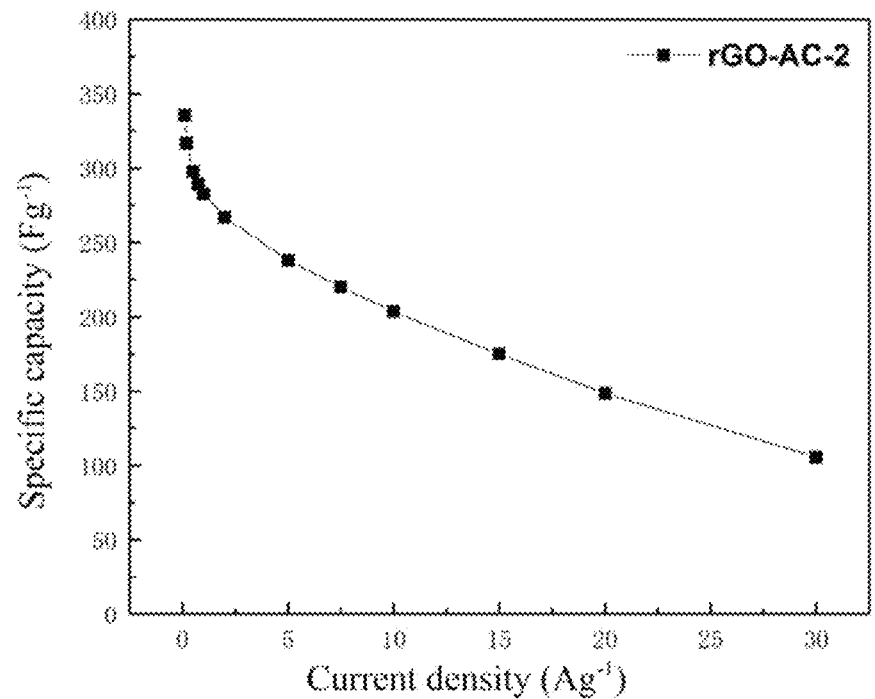
FIG. 7 shows a charge and discharge curve of the flexible free-standing electrode as prepared in Example 2 at different rates.

FIG. 6 shows a cyclic voltammetry test curve of a supercapacitor using the flexible free-standing electrode as prepared in Example 2;

FIG. 7 shows a charge and discharge curve of a supercapacitor using the flexible free-standing electrode as prepared in Example 2.

It can be seen from FIG. 6 that at different scan rates, the cyclic voltammetry curves all maintain rectangular shape, showing the behavior of electric double layer capacitance.

It can be seen from FIG. 7 that at a current density of 0.1 A/g, the specific capacitance of the flexible free-standing electrode could reach 335.3 F/g, and is 148.6 F/g at a current density of 20 A/g, showing excellent rate performance.

Example 3

Raw Materials:
porous carbon particles with a specific surface area of 3481 m$^2$/g, and a particle size of 1-5 μm; and
reduced graphene oxide (rGO): the graphene oxide solution prepared by the modified Staudenmaier method was freeze-dried, and the dried particles were placed in a hydrogen iodide vapor atmosphere and kept at 90° C. for 2 hours, obtaining a reduced graphene oxide (which has a sheet number of 3 to 6, and a sheet diameter of 3 to 15 μm).

Preparation of the Electrode:
(1) 10 mg of the reduced graphene oxide, 90 mg of the porous carbon particles were mixed with 6 mL of ethanol. The resulting mixture was poured into a homogenizer, and stirred at a speed of 500 r/min for 20 hours, and then dispersed under an ultrasonic (with a power of 400 W) for 3 hours, obtaining a uniformly mixed slurry (in which the mass ratio of the reduced graphene oxide and the porous carbon particles was 0.11:1, and the concentration of the mixed slurry was 5 mg/mL).

(2) The obtained mixed slurry was poured on a Teflon board, leveled by an automatic blade coater, and then left to stand at ambient temperature for 20 hours. After forming a film, the film was peeled off and dried at 80° C. for 6 hours, obtaining the large-area continuous flexible free-standing electrode.

Performance Test of the Electrode:
The large-area continuous flexible free-standing electrode prepared in Example 3 was subjected to a performance test (indicated by the legend "rGO-AC-3" in the figure) as follows: two circular flexible all-carbon composite electrodes with a diameter of 10 mm were used as two electrode sheets, cellulose paper was used as a separator, and an aqueous KOH solution with a concentration of 6 M was used as an electrolyte, and they were assembled into a supercapacitor.

Figure 8:
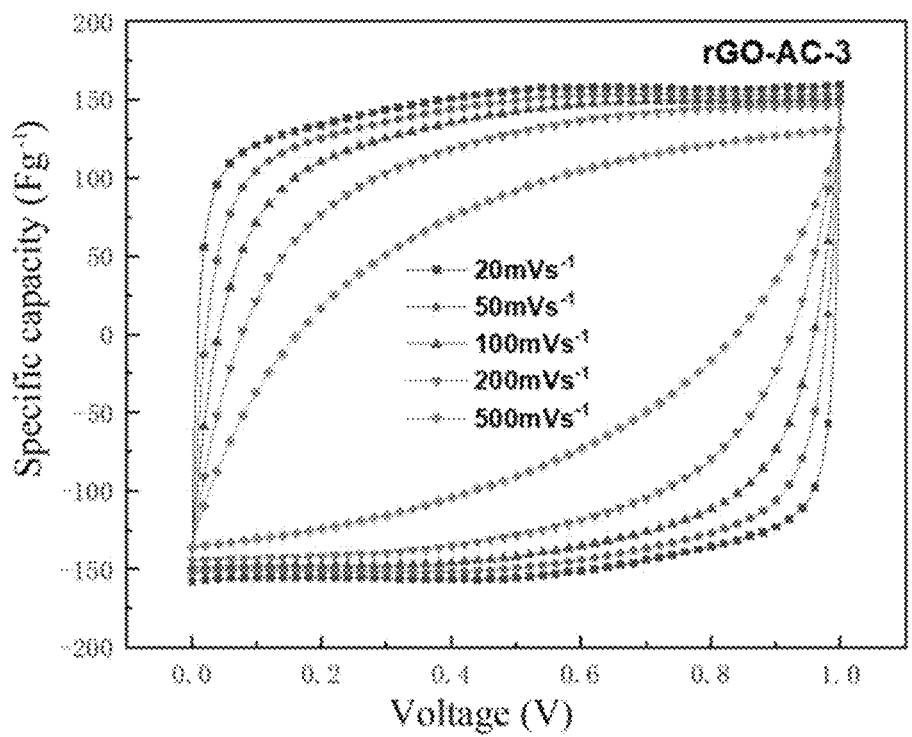
FIG. 8 shows cyclic voltammetry curves of the flexible free-standing electrode as prepared in Example 3 when used in a supercapacitor.
Figure 9:
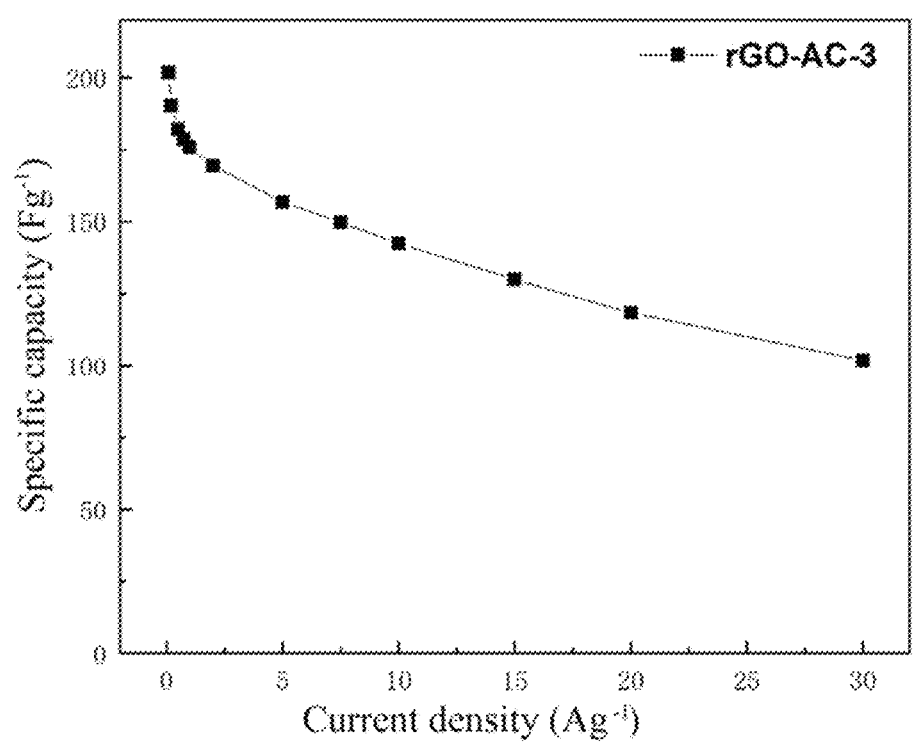
FIG. 9 shows a charge and discharge curve of the flexible free-standing electrode as prepared in Example 3 at different rates.

FIG. 8 shows a cyclic voltammetry test curve of a supercapacitor using the flexible free-standing electrode as prepared in Example 3;

FIG. 9 shows a charge and discharge curve of a supercapacitor using the flexible free-standing electrode as prepared in Example 3.

It can be seen from FIG. 8 that the curve maintains rectangular shape, showing the characteristics of a standard electric double layer capacitance; it can be seen from FIG. 9 that at a current density of 0.1 A/g, the specific capacitance of the flexible free-standing electrode is 201.8 F/g.

Comparative Example 1

Raw materials: porous carbon particles with a specific surface area of 2703 m$^2$/g, and a particle size of 1-5 μm; PTFE; carbon black.

Preparation of the Electrode:
(1) The porous carbon particles, carbon black and PTFE were mixed in ethanol in a mass ratio of 80:10:10, and the resulting mixture was poured into a homogenizer, and stirred at a speed of 300 r/min for 5 hours, and then dispersed under an ultrasonic (with a power of 400 W) for 1 hour, obtaining a uniformly mixed slurry.

(2) The obtained mixed slurry was poured onto a foamed nickel, and rolled into a film and cut into a circular sheet with a diameter of 10 mm, then the circular sheet was pressed on the foamed nickel collector and fixed, and dried in vacuum at 120° C. for 6 hours, obtaining a porous carbon electrode with PTFE as the binder.

FIG. 5 shows the charge and discharge curves of the porous carbon electrode as prepared in the Comparative Example with PTFE as the binder under different rates.

It can be seen from FIG. 5 that at a current density of 0.1 A/g, the specific capacitance of the porous carbon electrode with PTFE as the binder is 266.5 F/g, and is merely 173.9 F/g at a current density of 20 A/g. Compared with the large-area continuous flexible free-standing electrodes as prepared in Examples 1 to 3, the porous carbon electrode with PTFE as the binder not only exhibits a lower specific capacitance, but also exhibits a poorer rate performance. It shows that the large-area continuous flexible free-standing electrode prepared by self-assembly while with graphene as the conductive binder exhibits better electrochemical performance than the traditional electrode with PTFE as the binder, and the preparation process is also simpler.

The above are only the preferred examples of the present disclosure. It should be pointed out that for those skilled in the art, without departing from the principle of the present disclosure, several improvements and modifications could be made, and these improvements and modifications also shall fall within the protection scope of the present disclosure.

What is claimed is:

1. A method for preparing a continuous flexible free-standing electrode, comprising:
   (1) mixing a reduced graphene oxide, porous carbon particles and a solvent, and dispersing the resulting mixture to obtain a mixed slurry, wherein
   the reduced graphene oxide has a sheet number of 2 to 6, and a sheet diameter of 1 to 20 μm,
   the porous carbon particles have a particle size of 1 to 5 μm,
   a mass ratio of the reduced graphene oxide to the porous carbon particles is in a range of (0.05-0.5):1, and
   the mixed slurry has a mass volume concentration of 8 to 20 mg/mL; and
   (2) coating the mixed slurry obtained in step (1) onto a hydrophobic substrate, and drying, to obtain the continuous flexible free-standing electrode;
   wherein the coating is performed by a means which is one or more selected from the group consisting of automatic blade coating, slot extrusion coating, roll coating, air-knife coating, and dip coating.

2. The method of claim 1, wherein the porous carbon particles have a specific surface area of 1500 to 4500 m$^2$/g.

3. The method of claim 1, wherein the reduced graphene oxide in step (1) is obtained by reducing graphene oxide.

4. The method of claim 3, wherein the graphene oxide is prepared by a process which is one or more selected from the group consisting of a modified Hummer's method, Brodie's process, and Staudenmaier's process.

5. The method of claim 1, wherein the solvent in step (1) is one or more selected from the group consisting of N,N-dimethylformamide, ethanol, methanol, isopropanol, ethylene glycol, N-methylpyrrolidone, and tetrahydrofuran.

6. The method of claim 1, wherein the dispersing in step (1) comprises stirring and sonicating the resulting mixture in sequence.

* * * * *